(12) United States Patent
Livingston

(10) Patent No.: US 7,184,635 B2
(45) Date of Patent: Feb. 27, 2007

(54) OPTICAL FIBER ARRAY CONNECTIVITY SYSTEM UTILIZING ANGLE POLISHED FERRULES AND ALIGNED-KEY ADAPTERS AND CABLE FOR SAME

(75) Inventor: Joseph C. Livingston, Frisco, TX (US)

(73) Assignee: Commscope Solutions Properties, LLC, Sparks, NV (US)

( * ) Notice: Subject to any disclaimer, the term of this patent is extended or adjusted under 35 U.S.C. 154(b) by 93 days.

(21) Appl. No.: 10/920,102

(22) Filed: Aug. 17, 2004

(65) Prior Publication Data

US 2005/0271338 A1    Dec. 8, 2005

Related U.S. Application Data

(60) Provisional application No. 60/577,305, filed on Jun. 4, 2004.

(51) Int. Cl.
  *G02B 6/44* (2006.01)
  *G02B 6/38* (2006.01)
  *G02B 6/43* (2006.01)

(52) U.S. Cl. ............................. 385/114; 385/71; 385/89

(58) Field of Classification Search ................ 385/100, 385/114, 50, 53, 147
See application file for complete search history.

(56) References Cited

U.S. PATENT DOCUMENTS

| | | | |
|---|---|---|---|
| 4,611,887 A | 9/1986 | Glover et al. | |
| 4,699,460 A | 10/1987 | Szentesi | |
| 5,066,094 A | 11/1991 | Takahashi | |
| 5,155,785 A | 10/1992 | Holland et al. | |
| 5,204,925 A | 4/1993 | Bonanni et al. | |
| 5,513,293 A | 4/1996 | Holland et al. | |
| 5,615,293 A | 3/1997 | Sayegh | |
| 5,867,620 A * | 2/1999 | Bunin et al. | 385/53 |
| 5,943,455 A | 8/1999 | Travieso et al. | |

(Continued)

FOREIGN PATENT DOCUMENTS

EP         1 039 323      *  9/2000

(Continued)

OTHER PUBLICATIONS

PCT International Search Report for PCT/US2005/019210.

(Continued)

*Primary Examiner*—Sung Pak
*Assistant Examiner*—Omar Rojas
(74) *Attorney, Agent, or Firm*—Myers Bigel Sibley & Sajovec

(57) ABSTRACT

A fiber optic ribbon cable includes: a plurality of substantially parallel optical fibers formed into a ribbon, the ribbon extending in a longitudinal direction and having first and second ends; and a termination assembly attached at each of the first and second ends of the ribbon. Each of the termination assemblies includes a body and a ferrule, the body having a key on an upper surface thereof. The ferrule has a polished contact surface that exposes ends of the optical fibers; the contact surface forms an oblique angle relative to a plane normal to axes defined by the fibers. The termination assemblies at the first and second ends of the ribbon either both face slightly upwardly or both face slightly downwardly.

28 Claims, 5 Drawing Sheets

U.S. PATENT DOCUMENTS

| | | |
|---|---|---|
| 6,078,714 A | 6/2000 | Cavanaugh |
| 6,219,479 B1 | 4/2001 | Madden et al. |
| 6,222,976 B1 | 4/2001 | Shahid |
| 6,224,269 B1 | 5/2001 | Engstrand et al. |
| 6,243,520 B1 | 6/2001 | Goldman |
| 6,351,590 B1 | 2/2002 | Shahid |
| 6,402,393 B1 | 6/2002 | Grimes et al. |
| 6,421,493 B1 | 7/2002 | Burek et al. |
| 6,434,316 B1 | 8/2002 | Grois et al. |
| 6,442,318 B1 | 8/2002 | Goldman |
| 6,450,701 B1 | 9/2002 | Cryan et al. |
| 6,464,404 B1 | 10/2002 | Robinson et al. |
| 6,554,483 B1 | 4/2003 | Sun et al. |
| 6,597,854 B2 | 7/2003 | Haataja et al. |
| 6,614,971 B2 | 9/2003 | Sun et al. |
| 6,619,853 B2 | 9/2003 | Grois et al. |
| 6,623,173 B1 | 9/2003 | Grois et al. |
| 6,633,710 B2 | 10/2003 | Chiarulli et al. |
| 6,663,710 B1 | 12/2003 | Fujita et al. |
| 6,758,600 B2 | 7/2004 | Del Grosso et al. |
| 6,905,257 B2 * | 6/2005 | Eichenberger et al. ........ 385/89 |

FOREIGN PATENT DOCUMENTS

| | | | |
|---|---|---|---|
| JP | | 63167324 * | 7/1988 |
| JP | | 6118282 | 4/1994 |
| JP | | 6347670 | 12/1994 |
| JP | | 8005868 | 1/1996 |
| JP | | 2001-525557 | 12/2001 |
| JP | | 2002-148480 | 5/2002 |
| JP | | 2002-148481 | 5/2002 |
| WO | WO 99/28773 | | 6/1999 |

OTHER PUBLICATIONS

CommScope Company "Systimax® InstaPATCH™ System" 8 pages (2004).

Patterson, Brian T. "From Evolution to Revolution" *Tyco Electronics Fiber Optics Business Unit* (2001).

TIA Engineering Manual 69 pages (1991).

TIA Standart "FOCIS 5 Fiber Optic Connector Intermateability Standard—Type MPO" TIA-604-5B (revision of TIA/EIA-604-5A) 18 pages (Aug. 2002).

TIA/EIA "Guidelines for Maintaining Optical Fiber Polarity with Systems Utilizing MPO (MTP) Connectors" draft copy, to be published as TSB-136 (Apr. 23, 2003).

TIA/EIA "Guidelines for Maintaining Optical Fiber Polarity with systems Utilizing MPO Connectors and 12-Fiber Ribbon Cables" draft copy, to be published as TSB-? 14 pages (Jan. 29, 2002).

* cited by examiner

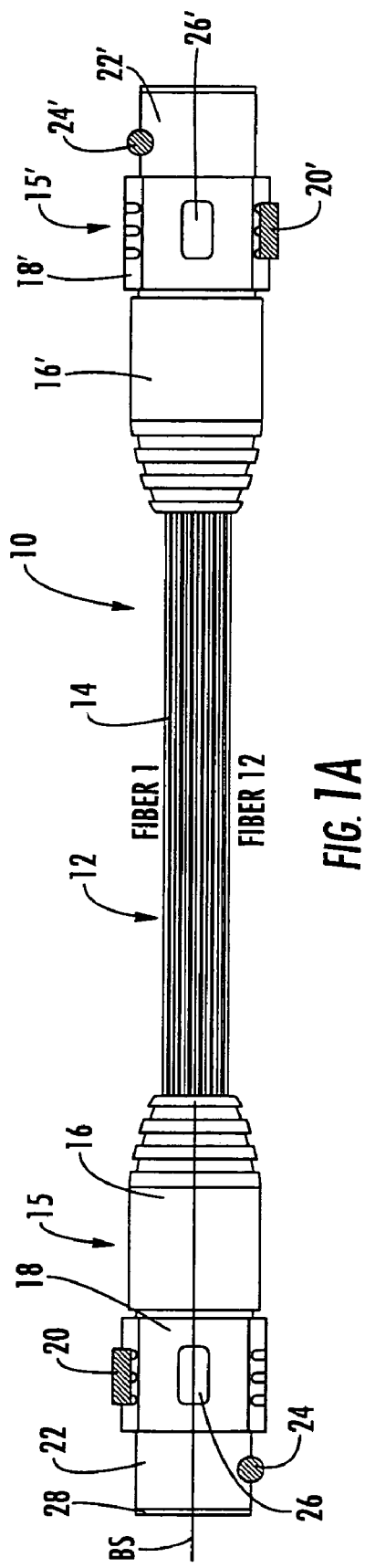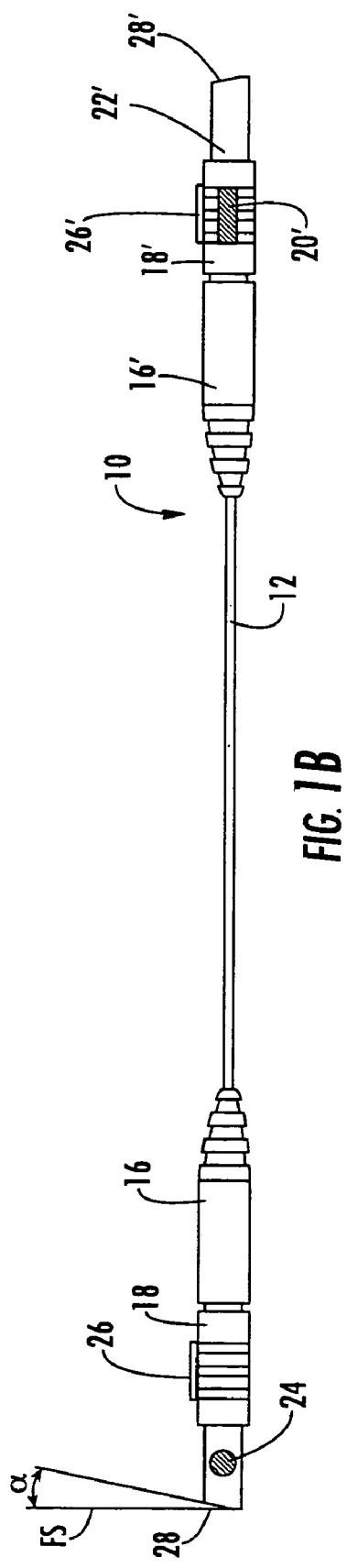
FIG. 1A
FIG. 1B

OPTICAL FIBER ARRAY CONNECTIVITY SYSTEM UTILIZING ANGLE POLISHED FERRULES AND ALIGNED-KEY ADAPTERS AND CABLE FOR SAME

RELATED APPLICATION

This application claims priority from U.S. Provisional Patent Application No. 60/577,305, filed 4 Jun. 2004, entitled "Singlemode Optical Fiber Array Connectivity System."

FIELD OF THE INVENTION

The present invention is directed generally to fiber optic ribbon cables, connectors, adapters, and patching systems.

BACKGROUND OF THE INVENTION

Optical fibers are commonly used today for the transmission of signals of all sorts, including communication and data signals. Optical fibers can be single mode fibers (typically employed in long-distance communication), which have only one strong propagation mode, or multi-mode fibers, in which light transmitted in the different modes arrives at different times, resulting in dispersion of the transmitted signal.

Single mode fibers transmit signals between transceivers (ie., devices that can both transmit and receive optical signals) via pairs of fibers. More specifically, one fiber of the pair will transmit signals from the first transceiver to the second, and the other fiber of the pair will transmit signals from the second transceiver to the first. In this manner, optical signals are not traveling along the same fiber in different directions, as such activity could interfere with both signals.

This pairing arrangement would be fairly simple to organize for two transceiver devices that are permanently optically connected, but in practice transceivers are typically connected through a much larger network of optical fibers, connectors and patch panels. For example, a common optical system includes multiple transceivers at one end, patch cord pairs that are connected to the transceivers and to a duplex adapter mounted on a patch panel, a fan-out unit connected to the duplex adapter that connects to a multi-fiber ribbon cable (12 fibers per ribbon is common) via an array adapter, a second fan-out unit connected to the opposite end of the ribbon cable via a second array adapter, and corresponding transceivers connected via patch cord pairs to the second fan-out unit through another duplex adapter. Thus, clearly it is important to be able to track individual optical fibers in the various devices and cables between the transceivers in order to ensure that the individual transceivers are connected as desired.

To ensure intermateability of cabling components and signal polarity, standards have been created to define arrangements of fibers, cables, adapters and connectors. For example, one such standard for array connectors, TIA-604-5B, is directed to MPO fiber optic connector intermateability. Another standard, TIA 568-B.3 with proposed addendum written by committee TR-42.8, is directed to maintaining optical fiber polarity with systems using array connectors and adapters, including MPO's. This proposed addendum discusses four different methods of creating an optical path from the transmit side of one transceiver to the receive side of another transceiver. One method, termed "Method A," is intended to "link multiple duplex optical transceiver ports or to link two parallel optics transceiver ports . . . " Systems built using Method A utilize Type A ribbon cables, Type A adapters, Type A transitions and 568B.3 patch cords.

One of the characteristics of a Method A optical path is that the array adapters are "key up to key up," or "aligned-key" style adapters. This term refers to the orientation of small projections, or "keys," located on the terminating bodies of cables that enable one connecting the cables to orient them correctly relative to the adapter (an incorrectly oriented cable would align the wrong fibers, which would prevent proper transmission of optical signals). Aligned-key adapters are less traditional for array connectors than the standard "key up to key down, or "opposed-key" adapters, but are an acceptable alternative defined as "key option k=2" in TIA-604-5B. To aid cable termination during manufacturing, some array connectors (including MPO's as an example) include a "body mark" (any visual indicia, often a white paint mark) on the body portion of each terminal assembly that indicates how the cable should be oriented for connection. Conventionally, the body marks of an array connector are located on the same side of the cable as a fiber designated "Fiber 1" and are to be on the left side of the body portion when viewed facing the exposed ends of the optical fibers with the key projecting upwardly.

One of the difficulties presented by "aligned-key" connections in Method A systems is the actual contact angle between mating fibers. Most cables terminate with a ferrule that exposes the ends of the fibers of the cable for optical interconnection with another cable. Once the fibers of a cable are inserted into a ferrule and bonded thereto, the exposed ends of the fibers are polished to improve the transmission of signals between joined fibers. The polishing can either be performed normal to the axes of the fibers (known as "flat" polishing), as is typically done for multi-mode applications, or at a slight oblique angle to the axes of the fibers (known as "angle" polishing), as is typically done for single mode applications. Angle polishing is typically preferred for single mode applications, as it reduces the risk that inadvertent light reflection from the end of the fiber will occur during transmission. However, angle polishing of ferrules requires that mating ferrules be oppositely angled; i.e., the angled face of one of the mating ferrules must face slightly upwardly and the angled face of the other ferrule must face slightly downwardly in order for these faces to abut correctly for light transmission. Each ferrule of an array connector will typically include a ferrule mark (again, typically some visual indicia such as a paint mark or molded-in designation) that indicates to one terminating the cable how to orient the ribbon of fibers in the ferrule prior to bonding and polishing. Conventionally, the ferrule mark is located on the same side of the cable as the aforementioned Fiber 1 and is also on the same side of the cable as the connector body mark. This placement instructs the installer to polish the contact surface such that, when the ferrule is viewed from the side of the ferrule that includes the ferrule mark with the exposed fibers facing to the right, the lower edge of the ferrule is worn away during the polishing process. In this conventional termination, the key on the connector body is facing up.

Because of the requirements associated with Method A mentioned above, with conventional components it is not possible to follow the Method A connectivity arrangement while still having both (a) the conventional "aligned-key" mating with adapters and (b) angle polished surfaces for the ferrules of the cables (in fact, the addendum to TIA 568-B.3 proposed by TIA TR-42.8 states that "all connectors used in Connectivity Method A must be flat polished; angle polished connectors cannot be connected key-up to key-up"). As such, an optical system that conforms to the connectivity requirements of Method A and meets these other configuration requirements would be desirable for single mode performance and polarity assurance.

SUMMARY OF THE INVENTION

The present invention can enable a data communication system to meet the requirements of the addendum to TIA 568-B.3 written by TIA TR 42.8 regarding array connectivity polarity while still providing the performance enhancements of angle polished terminations. As a first aspect, embodiments of the present invention are directed to a fiber optic ribbon cable. The cable comprises: a plurality of substantially parallel optical fibers formed into a ribbon, the ribbon extending in a longitudinal direction and having first and second ends; and a termination assembly attached at each of the first and second ends of the ribbon. Each of the termination assemblies includes a body and a ferrule, the body having a key on an upper surface thereof, and the ferrule having a polished contact surface that exposes ends of the optical fibers. The contact surface forms an oblique angle relative to a plane normal to axes defined by the fibers; either (a) each contact surface faces slightly upwardly, or (b) each contact surface faces slightly downwardly. This configuration provides aligned-key or "key up to key up" mating of fibers while also allowing the fibers to be angle polished.

As a second aspect, embodiments of the present invention are directed to a data communication system, comprising: first and second transceivers; first and second fan-out units; first and second adapters connected with the first and second fan-out units; and a ribbon trunk cable. Each fan-out unit includes a plurality of optical fibers. The first fan-out unit is optically connected with the first transceiver via a first pair of optical fibers, and the second fan-out unit is optically connected with the second transceiver via a second pair of optical fibers. Each of the first and second fan-out units further includes a ferrule with a polished contact surface exposing the ends of the plurality of optical fibers, the contact surface being at an oblique angle relative to a plane normal to axes of the optical fibers. Each of the termination bodies of the first and second fan-out units includes a key projecting upwardly from an upper surface thereof. The ribbon trunk cable comprises: a plurality of substantially parallel optical fibers formed into a ribbon, the ribbon extending in a longitudinal direction and having first and second ends; a termination assembly attached at each of the first and second ends of the ribbon, each of the termination assemblies including a body and a ferrule, the body having a key on an upper surface thereof, and the ferrule having a polished contact surface that exposes ends of the optical fibers. The contact surface forms an oblique angle relative to a plane normal to axes defined by the fibers. The termination assembly of the first end of the trunk cable is connected to the first adapter, and the termination assembly of the second end of the truck cable is connected to the second adapter. Either (a) each ferrule contact surface of the ribbon trunk cable faces slightly upwardly, or (b) each contact surface of the ribbon trunk cable faces slightly downwardly.

BRIEF DESCRIPTION OF THE FIGURES

FIG. 1A is a schematic top view of an embodiment of a ribbon cable of the present invention.

FIG. 1B is a side view of the ribbon cable of FIG. 1A.

DETAILED DESCRIPTION OF EMBODIMENTS OF THE INVENTION

Figure 2:
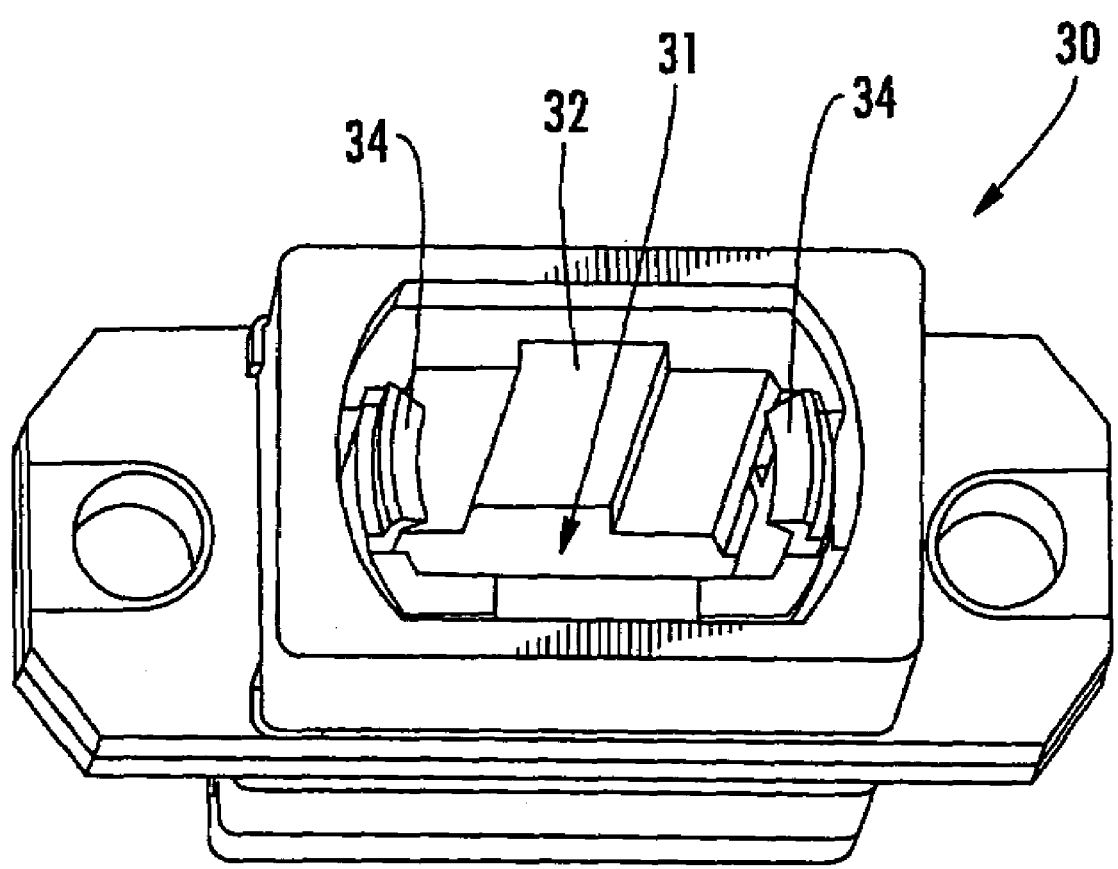
FIG. 2 is a perspective view of an array adapter that can be used with the ribbon cable of FIG. 1A.

The present invention will now be described more fully hereinafter, in which preferred embodiments of the invention are shown. This invention may, however, be embodied in different forms and should not be construed as limited to the embodiments set forth herein. Rather, these embodiments are provided so that this disclosure will be thorough and complete, and will fully convey the scope of the invention to those skilled in the art. In the drawings, like numbers refer to like elements throughout, and the thickness of lines, layers and regions may be exaggerated for clarity.

It will be understood that when an element is referred to as being "on" another element, it can be directly on the other element or intervening elements may also be present. In contrast, when an element is referred to as being "directly on" another element, there are no intervening elements present. It will be understood that when an element is referred to as being "connected" or "attached" to another element, it can be directly connected or attached to the other element or intervening elements may also be present. In contrast, when an element is referred to as being "directly connected" or "directly attached" to another element, there are no intervening elements present. As used herein, the term "and/or" includes any and all combinations of one or more of the associated listed items.

Referring now to the Figures, a fiber optic ribbon cable, designated broadly at 10, is illustrated in FIGS. 1A and 1B. The cable 10 includes a ribbon 12 and termination assemblies 15, 15' at either end of the ribbon 12. These components are described in greater detail below.

Referring again to FIGS. 1A and 1B, the ribbon 12 comprises 12 optical fibers 14, each of which has a core and a protective cladding. The fibers 14 are arranged in parallel relationship to form the ribbon 12. It is conventional to refer to the fibers of a ribbon individually as Fiber 1, Fiber 2, etc., for the sake of clarity; in the illustrated ribbon 12, Fiber 1 is nearest the top edge of FIG. 1A, Fiber 2 is below and adjacent Fiber 1, and so on, with Fiber 12 being the lowermost fiber in FIG. 1A. Other conventions associated with the fibers 14 include color and the like and are set forth in TLA/EIA-598, "Optical Fiber Cable Color Coding".

The structure and composition of typical optical fibers is well known to those skilled in this art and need not be described in detail herein. In some embodiments, the optical fibers are single mode fibers. Exemplary optical fibers include TeraSPEED™, available from SYSTIMAX® Solutions, Inc., Richardson, Tex.

Those skilled in this art will appreciate that ribbons of different configurations may also be employed. For example, ribbons with different numbers of fibers (6 and 8 fiber ribbons are common) may be used.

Referring still to FIGS. 1A and 1B, the terminal assembly 15 includes a ferrule 22 that is attached to the ribbon 12, a body 18 that is attached to the ferrule 22, and a boot 16 that is attached to the body 18. The construction and interconnection of the boot 16, body 18 and ferrule 22 are well-known to those skilled in this art and need not be described in detail herein.

Referring once again to FIGS. 1A and 1B, the ferrule 22 includes a contact surface 28 that exposes the fibers 14 to mating fibers in a mating component. The contact surface 28 faces slightly upwardly, angled relative to a plane FS normal to the axes of the fibers 14 at an angle α. Typically the angle a is between about 5 and 15 degrees; for example, an angle of 8 degrees is specified in TIA-604-5B for MPO connectors.

Still referring to FIGS. 1A and 1B, the body 18 includes an alignment key 26 on its top surface. The body 18 may also include a body mark 20 (as with the MPO connector shown schematically in FIG. 1A) that identifies for an operator the proper orientation of the body 18 and ferrule 20 for assembly. In the illustrated embodiment, the body mark 20 is on the same side of a bisecting surface BS (which vertically bisects the body 18 and ferrule 22) as the aforementioned Fiber 1. The body mark 20 may be any visual indicia (such as a paint mark) understood by those skilled in this art as being appropriate for identifying the proper orientation of the terminal assembly 15.

Referring still to FIGS. 1A and 1B, the illustrated ferrule 22 includes an optional ferrule mark 24 (as with an MPO connector) that identifies for an operator the proper orientation of the fibers 14 and the ferrule 22 during polishing of the contact surface 28. The ferrule mark 24 is positioned on the ferrule 22 on the side of the bisecting surface BS opposite that of the body mark 20; i.e., on the same side as Fiber 12. The operator is to insert the fibers 14 into the ferrule 22 such that Fiber 12 is on the same side of the ferrule 22 as the ferrule mark 24 (this varies from conventional fiber insertion). Also, this location of the ferrule mark 24 indicates that an operator angle polishing the ends of the fibers 14 will form the contact surface 28 such that it cants or faces slightly upwardly.

Referring yet again to FIGS. 1A and 1B, the terminal assembly 15' includes a boot 16', a body 18' and a ferrule 22' that are similar in construction to the terminal assembly 15. In particular, the key 26' projects upwardly, and the angled contact surface 28' faces slightly upwardly and forms an angle α' with a plane normal to the axes of the fibers 14 as they terminate at the ferrule 22'. The differences between the terminal assembly 15' and the terminal assembly 15 include (a) the placement of the body mark 20' on the side of the ribbon 12 that corresponds to Fiber 12 and (b) the placement of the ferrule mark 24' (if included as with an MPO connector) on the side of the ribbon 12 that corresponds to Fiber 1. These placements result in the body marks 18, 18' being positioned on opposite sides of the ribbon 12 (i.e., on opposite sides of the bisecting plane BS and the keys 26, 26'), and the ferrule marks 24, 24' also being positioned on opposite sides of the ribbon 12, with the ferrule and body marks on each end of the cable 10 being on opposite sides of their respective terminal assemblies 15, 15'.

Turning now to FIG. 2, an MPO adapter, designated broadly at 30, is illustrated therein. The adapter 30 includes an opening 31 that passes therethrough. A keyway 32 also extends through the adapter 30 contiguous with the opening 31 and is sized and configured to receive either of the keys 26, 26' from the cable 10 as well as a mating key from another component, such as a tan-out unit. Latches 34 extend slightly into the opening to engage and secure a respective terminal assembly 15, 15'. The exemplary MPO adapters and other array adapters suitable for use with embodiments of the present invention are well-known to those skilled in this art, and their construction and materials need not be described in further detail herein. The exemplary MPO array adapter 30 is described in TIA-604-5B, with the aligned key example described as "key option k=2."

Figure 3:
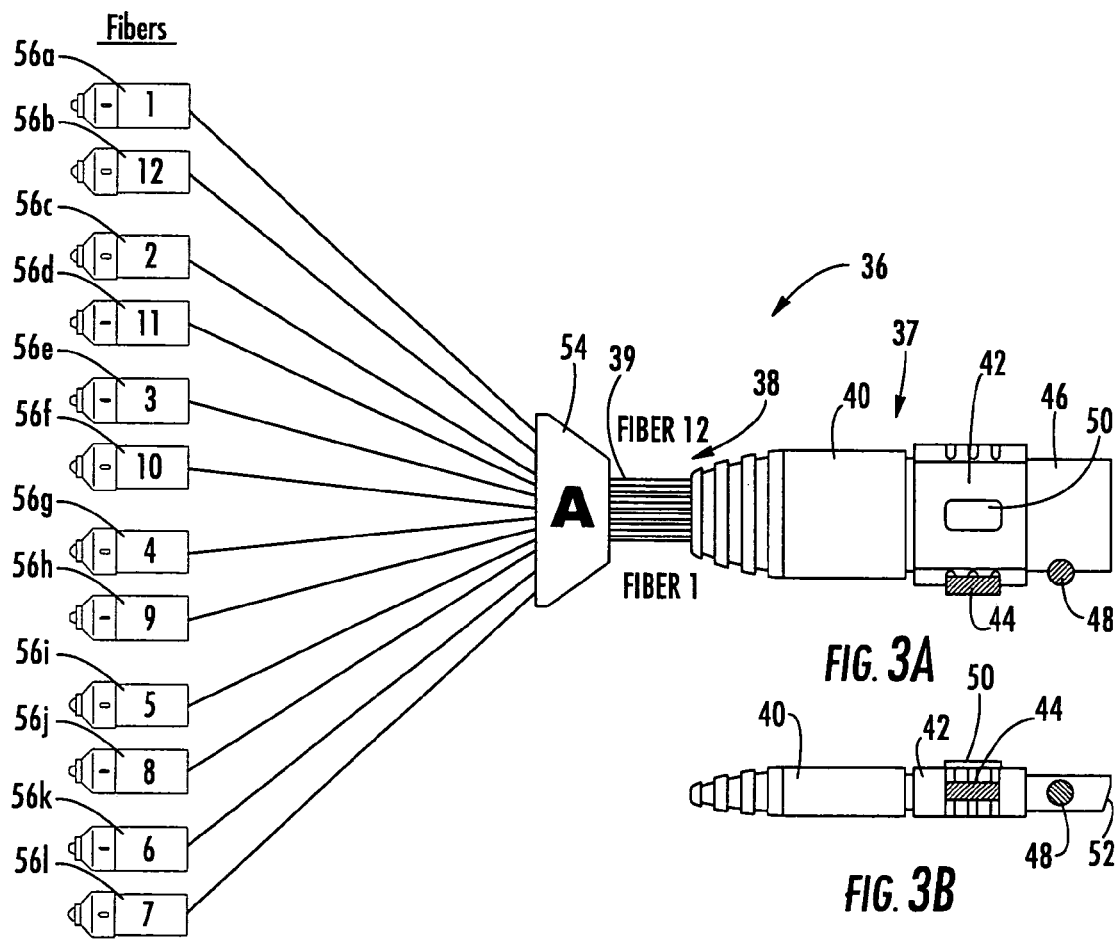
FIG. 3A is a schematic top view of an embodiment of a fan-out unit for use with the ribbon cable of FIG. 1A.
FIG. 3B is a side view of the fan-out unit of FIG. 3A.

Now referring to FIGS. 3A and 3B, a fan-out unit, designated broadly at 36, includes a ribbon portion 38 comprising optical fibers 39, a transition piece 54, a terminal assembly 37, and single fiber connectors 56a–56l. The ribbon portion 38 extends between the terminal assembly 37 and the transition piece 54; from the transition piece 54, the fibers 39 separate or "fan out" into pairs before terminating in respective single fiber connectors 56a–56l. The pairing of the fibers 39 follows an "outside-in" convention prescribed in the addendum proposed by TIA TR-42.8 to TIA 568-B.3 and identified as Method A, such that Fibers 1 and 12 are paired, Fibers 2 and 11 are paired, and so on until Fibers 6 and 7 are paired. This pairing arrangement is also described in U.S. Pat. No. 6,785,600 to Del Grosso et al., the disclosure of which is hereby incorporated herein by reference in its entirety.

The terminal assembly 37 includes a boot 40, a body 42 and a ferrule 46 like those described above in connection with the cable 10, with the exceptions that the ribbon portion 38, the ferrule 46, the angle polish, and the body 42 are conventionally terminated; as in the exemplary MPO connector, (a) the body mark 44 and ferrule mark 48 are on the same side of the ribbon portion 38 and on the same side as Fiber 1, and (b) although the key 50 projects upwardly from the ferrule 46, the angled contact surface 52 of the ferrule 46 faces slightly downwardly. As discussed below, this orientation of the contact surface 52 enables the terminal assembly 37 of the fan-out unit 36 to mate with the terminal assembly 15 of the cable 10.

The construction of the fan-out unit 36, including the ribbon portion 38, the transition piece 54, the terminal assembly 37, and the single fiber connectors 56a–56l, will be well understood by those skilled in this art. An exemplary fan-out unit is available from SYSTIMAX® Solutions, Inc., Richardson, Tex.

Figure 4:
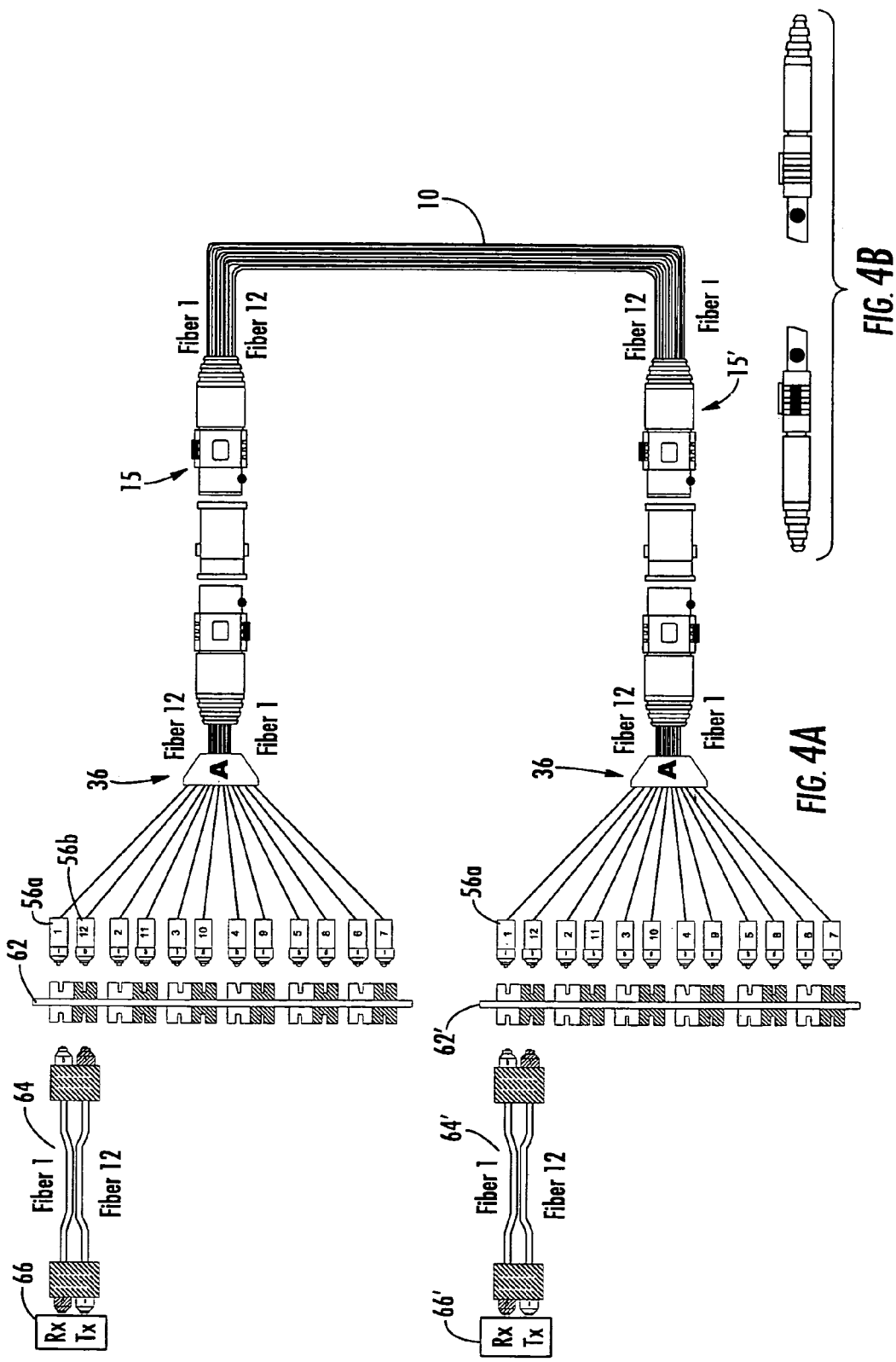
FIG. 4A is a schematic top view of a data transmission system employing a ribbon cable of FIG. 1A.
FIG. 4B is a partial side view of a connection between the terminal of the ribbon cable of FIG. 1A and the fan-out unit of FIG. 3A.

FIG. 4A illustrates a data transmission system 60 that employs the cable 10, two array adapters 30 and two identical fan-out units 36 of the type described above. The system 60 also includes a number of transceivers 66, 66' located at the far ends of the system 60 (only two transceivers are shown herein for the purpose of clarity). The transceivers 66, 66' may be any number of devices that transmit and receive optical data over optical fiber networks, including computers, telephones, servers and routers. Each transceiver 66, 66' is connected with a corresponding pair of conventional, TIA/EIA-568-B.3 compliant patch cords 64, 64'. The patch cords 64, 64' are in turn connected with ports in one of two duplex adapters 62, 62', the construction and function of which will be understood by those skilled in this art. The single fiber connectors 56a–56l of each fan-out unit 36 plug into a respective duplex adapter 62, 62' in pairs as described above and illustrated in FIGS. 4A and 4B. At its opposite end, a second identical fan-out assembly 36 is connected to a respective terminal assembly 15, 15' of the cable 10 via one of the array adapters 30.

As can be seen in FIGS. 4A and 4B, the connections between the fan-out units 36 and the terminal assemblies 15, 15' of the cable 10 are "key-up to key-up," which matches the requirements of the addendum proposed by TIA TR-42.8 to TIA 568-B.3 and identified as Method A. However, with the inventive configuration, the contact surfaces 28, 28' of the terminal assemblies 15, 15', which face slightly upwardly, are able to mate with the contact surfaces 52 of the fan-out units 36, which face slightly downwardly. The mating of these angled contact surfaces provides transmission of optical data in a manner that is typically better than that of non-angled (i.e., flat) contact surfaces, and does so with a "key up to key up" orientation of the terminal bodies 18, 18' of the cable 10 and the terminal bodies 42 of the fan-out units 36 (see FIG. 4B). Notably, either of the terminal assemblies 15, 15' can be connected with either of the fan-out units 36 and still be operable.

It can be verified that the system 60 indeed provides proper connectivity for optical signals by tracing the transmission paths between a pair of connected transceivers 66, 66'. Turning to FIG. 4A and beginning with the transmitting portion Tx of the transceiver 66, an optical signal originating there would travel through the patch cord 64 labeled "Fiber 12" to the duplex adaptor 62. The signal would then travel through the signal fiber connector 56b into Fiber 12 of the fan-out assembly 36, which conveys the signal to the array adapter 30. At this point the signal is transmitted through the terminal assembly 15 to Fiber 1 of the cable 10, which is aligned with Fiber 12 of the fan-out assembly 36. The signal travels through the cable 10 in Fiber 1 to the terminal assembly 15', through the second array adapter 30, and into the second fan-out unit 36, where the signal is transmitted to Fiber 1 thereof. The signal then travels in Fiber 1 of the second fan-out unit 36 through the single fiber connector 56a, the duplex adapter 62', Fiber 1 of the patch cord pair 64', and into the receive portion Rx of the transceiver 66'. Thus, the signal is properly transmitted from the transmitting portion of the transceiver 66 to the receiving portion of the transceiver 66'.

Continuing to refer to FIG. 4A, a parallel transmission path can be traced from the transmitting portion Tx of the transceiver 66' to the receiving portion Rx of the transceiver 66. More specifically, the signal travels from the transmitting portion Tx of the transceiver 66' through Fiber 12 of the patch cord pair 64', through the duplex adapter 62' into Fiber 12 of the second fan-out unit 36, through the second array adapter 30 into Fiber 12 of the cable 10, through the first array adapter 30 and into Fiber 1 of the first fan-out unit 36, and through the duplex adapter 62 into Fiber 1 of the patch cord pair 64 for delivery into the receiving portion Rx of the transceiver 66. Thus, it can be seen that the signal is properly transmitted from the transmitting portion Tx of the transceiver 66' to the receiving portion Rx of the transceiver 66.

It will also be understood by those skilled in this art that the cable 10 can be configured such that, rather than the contact surfaces 28 of the ferrules 22, 22' facing slightly upwardly, the ribbon 12 can be oriented such that the contact surfaces 28 face slightly downwardly while the keys 26 still project upwardly. Such a modification would employ fan-out units 36 that have keys and contact surfaces that face slightly upwardly as their keys 50 extend upwardly.

Figure 5:
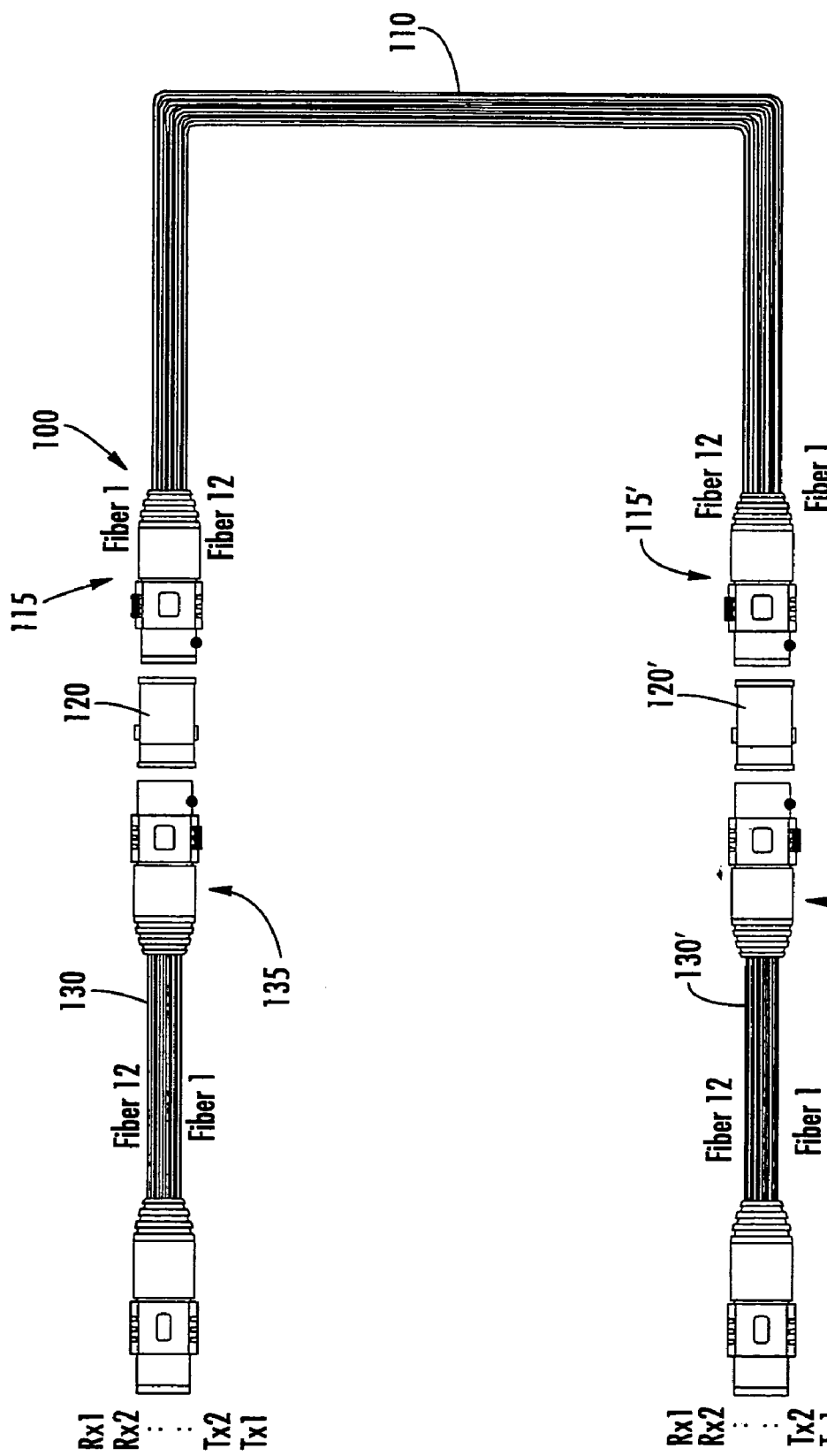
FIG. 5 is a schematic top view of an alternative data transmission system employing a ribbon cable of FIG. 1A.

Another system, designated broadly at 100, that can employ a cable of the present invention is illustrated in FIG. 5. The system 100 includes a ribbon trunk cable 110 that is configured like cable 10 described above. "Aligned-key" array adapters 120, 120' are connected to each end of the cable 110. Ribbon patch cords 130, 130' are then connected to the array adapters 120, 120' and can, in turn be connected to array transceivers. The configurations of the terminal assemblies 115, 115' of the ribbon trunk cable 110 are identical to those of the cable 10 described above, and the terminal assemblies 135 of the array patch cords 130 are identical to the terminal assemblies 50 of the fan-out units 36 described above. As such, the desired "key up to key up" connection of the cable 110 and patch cords 130, 130' is employed with angle polished fibers.

Those skilled in this art will recognize that other data communication systems may also employ ribbon trunk cables of the present invention with aligned-key adapters. Exemplary alternative systems include ruggedized array connector-to-single fiber fanouts replacing the fan-out units 36 and 36', the duplex adapters 62 and 62', and the duplex patch cords 64 and 64' described in FIG. 4A.

The foregoing is illustrative of the present invention and is not to be construed as limiting thereof. Although exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as recited in the claims. The invention is defined by the following claims, with equivalents of the claims to be included therein.

That which is claimed is:

1. A data communication system, comprising:
   first and second transceivers;
   first and second fan-out units, each of which includes a plurality of optical fibers, wherein the first fan-out unit is optically connected with the first transceiver via a first pair of optical fibers, and the second fan-out unit is optically connected with the second transceiver via a second pair of optical fibers, each of the first and second fan-out units further including a termination body and a ferrule with a polished contact surface exposing the ends of the plurality of optical fibers, the contact surface being at an oblique angle relative to a plane normal to axes of the optical fibers, each of the termination bodies of the first and second fan-out units including a key projecting upwardly from an upper surface thereof;
   first and second adapters connected with, respectively, the ferrules of the first and second fan-out units; and
   a ribbon trunk cable comprising:
      a plurality of substantially parallel optical fibers formed into a ribbon, the ribbon extending in a longitudinal direction and having first and second ends;
      a termination assembly attached at each of the first and second ends of the ribbon, each of the termination assemblies including a body and a ferrule, the body having a key on an upper surface thereof, the ferrule having a polished contact surface that exposes ends of the optical fibers, wherein the contact surface forms an oblique angle relative to a plane normal to axes defined by the fibers;
   wherein the termination assembly of the first end of the trunk cable is connected to the first adapter, and the termination assembly of the second end of the truck cable is connected to the second adapter; and
   wherein either (a) each ferrule contact surface of the ribbon trunk cable faces slightly upwardly, or (b) each contact surface of the ribbon trunk cable faces slightly downwardly.

2. The data communication system defined in claim 1, wherein the optical fibers of each of the fan-out units are separated into pairs, and wherein the fibers are paired in an outside-in sequence.

3. The data communication system defined in claim 2, wherein each of the fan-out units includes an even number of fibers, and the trunk cable includes the same even number of fibers.

4. The data communication system defined in claim 1, wherein an outermost fiber of each of the ribbons of the first and second fan-out units is designated Fiber 1, and another outermost fiber of each of the ribbons of the first and second fan-out units is designated Fiber n, and outermost fibers of the ribbon trunk cable are designated Fibers 1 and n, and wherein Fiber 1 of the trunk cable is optically connected with Fiber n of the first fan-out unit and Fiber 1 of the second fan-out unit, and wherein Fiber n of the trunk cable is optically connected with Fiber 1 of the first fan-out unit and Fiber n of the second fan-out unit.

5. The data communication system defined in claim 1, wherein the optical fibers of the trunk cable are single mode optical fibers.

6. The data communication system defined in claim 1, wherein the first and second adapters are aligned-key array adapters.

7. The data communication system defined in claim 1, wherein the first and second transceivers are connected with the first and second fan-out units via respective duplex aligned-key adapters.

8. The data communication system defined in claim 1, wherein the oblique angle between the contact surfaces of the ferrules of the trunk cable and the planes normal to the axes of the fibers is between about 5 and 15 degrees.

9. The data communication system defined in claim 1, wherein the oblique angle is about 8 degrees.

10. The data communication system defined in claim 1, wherein the termination assembly at the first end of the ribbon includes a first body mark and a first ferrule mark on opposite transverse sides of the key, and the termination assembly at the second end of the ribbon includes a second body mark and a second ferrule mark on opposite transverse sides of the key, and wherein the first and second body marks are on opposite transverse sides of the key.

11. The data communication system defined in claim 10, wherein, when viewed facing the contact surface with the key projecting upwardly, each of the first and second body marks is positioned on the left side of the body, and each of the first and second ferrule marks is positioned on the right side of the body.

12. A fiber optic ribbon cable, comprising:
a plurality of substantially parallel optical fibers formed into a ribbon, the ribbon extending in a longitudinal direction and having first and second ends;
a termination assembly attached at each of the first and second ends of the ribbon, each of the termination assemblies including a body and a ferrule, the body having a key on an upper surface thereof, the ferrule having a polished contact surface that exposes ends of the optical fibers, wherein the contact surface forms an oblique angle relative to a plane normal to axes defined by the fibers, and
wherein either (a) each contact surface faces slightly upwardly, or (b) each contact surface faces slightly downwardly; and
wherein the termination assembly at the first end of the ribbon includes a first body mark and a first ferrule mark on opposite transverse sides of the key, and the termination assembly at the second end of the ribbon includes a second body mark and a second ferrule mark on opposite transverse sides of the key, and wherein the first and second body marks are on opposite transverse sides of the key.

13. The fiber optic ribbon cable defined in claim 12, wherein, when viewed facing the contact surface with the key projecting upwardly, each of the first and second body marks is positioned on the left side of the body, and each of the first and second ferrule marks is positioned on the right side of the body.

14. The fiber optic ribbon cable defined in claim 12, wherein the contact surface of each of the ferrules faces slightly upwardly.

15. The fiber optic ribbon cable defined in claim 12, wherein the plurality of optical fibers comprises an even number of optical fibers.

16. The fiber optic ribbon cable defined in claim 15, wherein an outermost one of the optical fibers is designated as Fiber 1 and the opposite outermost optical fiber is designated Fiber n, and wherein when the contact surface of the first end is viewed with the termination key up, Fiber 1 is positioned on the left, and wherein the contact surface of the second end is viewed with the termination key up, Fiber n is positioned on the left.

17. The fiber optic ribbon cable defined in claim 12, wherein the optical fibers are single mode optical fibers.

18. The fiber optic ribbon cable defined in claim 12, wherein the oblique angle between the contact surfaces of the ferrules of the trunk cable and the planes normal to the axes of the fibers is between about 5 and 15 degrees.

19. The fiber optic ribbon cable defined in claim 18, wherein the oblique angle is about 8 degrees.

20. A data communication system, comprising:
first and second transceivers;
first and second fan-out units, each of which includes a plurality of optical fibers, wherein the first fan-out unit is optically connected with the first transceiver via a first pair of optical fibers, and the second fan-out unit is optically connected with the second transceiver via a second pair of optical fibers, each of the first and second fan-out units further including a termination body and a ferrule with a contact surface exposing the ends of the plurality of optical fibers, the contact surface being at an oblique angle relative to a plane normal to axes of the optical fibers, each of the termination bodies of the first and second fan-out units including a key projecting upwardly from an upper surface thereof;
first and second adapters connected with, respectively, the ferrules of the first and second fan-out units; and
a trunk cable, comprising:
a plurality of optical fibers extending in a longitudinal direction and having first and second ends;
a termination assembly attached at each of the first and second ends of the optical fibers, each of the termination assemblies including a body and a ferrule, the body having a key on an upper surface thereof, the ferrule having a contact surface that exposes ends of the optical fibers, the optical fiber ends being arranged to define a first plane, wherein the contact surface forms an oblique angle relative to a second plane normal to the first plane and axes defined by the optical fibers;
wherein the termination assembly of the first end of the trunk cable is connected to the first adapter, and the termination assembly of the second end of the trunk cable is connected to the second adapter; and wherein either (a) each contact surface of the trunk cable faces slightly upwardly, or (b) each contact surface of the trunk cable faces slightly downwardly.

21. The data communication system defined in claim 20, wherein the optical fibers of each of the fan-out units are separated into pairs, and wherein the fibers are paired in an outside-in sequence.

22. The data communication system defined in claim 21, wherein each of the fan-out units includes an even number of fibers, and the trunk cable includes the same even number of fibers.

23. The data communication system defined in claim 20, wherein an outermost fiber of each of the ribbons of the first and second fan-out units is designated Fiber 1, and another outermost fiber of each of the ribbons of the first and second fan-out units is designated Fiber n, and outermost fibers of the ribbon trunk cable are designated Fibers 1 and n, and wherein Fiber 1 of the trunk cable is optically connected with Fiber n of the first fan-out unit and Fiber 1 of the second fan-out unit, and wherein Fiber n of the trunk cable is optically connected with Fiber 1 of the first fan-out unit and Fiber n of the second fan-out unit.

24. The data communication system defined in claim 20, wherein the optical fibers of the trunk cable are single mode optical fibers.

25. The data communication system defined in claim 20, wherein the first and second adapters are aligned-key array adapters.

26. The data communication system defined in claim 20, wherein the first and second transceivers are connected with the first and second fan-out units via respective duplex aligned-key adapters.

27. The data communication system defined in claim 20, wherein the oblique angle between the contact surfaces of the ferrules of the trunk cable and the second plane is between about 5 and 15 degrees.

28. The data communication system defined in claim 27, wherein the oblique angle is about 8 degrees.

* * * * *

UNITED STATES PATENT AND TRADEMARK OFFICE
CERTIFICATE OF CORRECTION

| | |
|---|---|
| PATENT NO. | : 7,184,635 B2 |
| APPLICATION NO. | : 10/920102 |
| DATED | : February 27, 2007 |
| INVENTOR(S) | : Linvingston |

It is certified that error appears in the above-identified patent and that said Letters Patent is hereby corrected as shown below:

Title Page,
References Cited

U.S. Patent Documents

Item (56) Please add --6,646,404 Robinson et al. 10/02--and --2004-0042733 Kano et al. 3/04--

Signed and Sealed this

Eighth Day of May, 2007

JON W. DUDAS
*Director of the United States Patent and Trademark Office*